US007062973B2

(12) United States Patent
Tam et al.

(10) Patent No.: US 7,062,973 B2
(45) Date of Patent: Jun. 20, 2006

(54) PRESSURE GAUGE

(75) Inventors: Hwayaw Tam, Kowloon (HK); Aping Zhang, Kowloon (HK); Shunyee Liu, Kowloon (HK); Wenghong Chung, Kowloon (HK)

(73) Assignee: The Hong Kong Polytechnic University, Hong Kong SAR (CN)

( * ) Notice: Subject to any disclaimer, the term of this patent is extended or adjusted under 35 U.S.C. 154(b) by 61 days.

(21) Appl. No.: 10/953,883

(22) Filed: Sep. 30, 2004

(65) Prior Publication Data
US 2006/0070446 A1    Apr. 6, 2006

(51) Int. Cl.
*G01L 9/00*    (2006.01)
(52) U.S. Cl. .................... 73/705; 250/227.14; 250/230
(58) Field of Classification Search .......... 73/700–756; 250/227.14, 230
See application file for complete search history.

(56) References Cited

U.S. PATENT DOCUMENTS

| 5,091,983 | A | * | 2/1992 | Lukosz .................... 385/13 |
| 5,394,488 | A | * | 2/1995 | Fernald et al. ............. 385/13 |
| 6,256,090 | B1 | * | 7/2001 | Chen et al. ................ 356/73.1 |
| 6,276,215 | B1 |   | 8/2001 | Berg ........................ 73/800 |
| 6,680,472 | B1 | * | 1/2004 | Thingbø et al. ....... 250/227.12 |
| 2004/0113055 | A1 | * | 6/2004 | Whelan et al. ........ 250/227.18 |

* cited by examiner

*Primary Examiner*—Edward Lefkowitz
*Assistant Examiner*—Jermaine Jenkins
(74) *Attorney, Agent, or Firm*—Jacobson Holman PLLC

(57) ABSTRACT

A pressure gauge includes a housing and a mechanical sensor placed in the housing for sensing change of the pressure. A characteristic of the sensor varies in correspondence to the change of the pressure. The gauge also includes an optical fiber, at least part of which is in the housing with a first end connected to the sensor such that a characteristic of the fiber varies in correspondence to the variance of the characteristic of the sensor, and an optical signal generator connected to a second end of the fiber for emitting an optical signal into the fiber. The second end of the fiber is distanced from the sensor, and the fiber generates at least a first reflected optical signal towards said second end, which first reflected optical signal contains information relating to the variance of the characteristic of the fiber. The gauge further includes an optical signal analyzer connected to the second end of the fiber for receiving and analyzing the first reflected optical signal for ascertaining the change of the pressure based upon the information contained in the reflected optical signal.

14 Claims, 1 Drawing Sheet

PRESSURE GAUGE

BACKGROUND

1. Field of the Invention

The present invention relates to devices and methods for measuring pressure changes.

2. Background of the Invention

Electronic sensors are widely used in conventional pressure gauges for measuring pressure changes. However, disadvantages exist with these conventional pressure gauges. Firstly, the conventional pressure gauges using the electronic sensors may not be reliable in that performance of the electronic sensors may be significantly affected by external electromagnet radiation. Furthermore, the electronic sensors need to be activated and/or powered by electricity, which may generate sparks. Therefore, the conventional pressure gauges with electronic sensors may not be suitable for hazardous areas, for example, in flammable liquid or gas.

OBJECT OF THE INVENTION

Therefore, it is an object of the present invention to provide an improved pressure gauge, which is more reliable and which, preferably, is more suitable for the hazardous areas, or at least provide the public with a useful choice.

SUMMARY OF THE INVENTION

According to an aspect of the present invention, a pressure gauge includes a housing and a mechanical sensor placed in the housing for sensing change of the pressure. A characteristic of the sensor varies in correspondence to the change of the pressure. The gauge also includes an optical fiber, at least part of which is in the housing with a first end connected to the sensor such that a characteristic of the fiber varies in correspondence to the variance of the characteristic of the sensor, and an optical signal generator connected to a second end of the fiber for emitting an optical signal into the fiber. The second end of the fiber is distanced from the sensor, and the fiber generates at least a first reflected optical signal towards said second end, which first reflected optical signal contains information relating to the variance of the characteristic of the fiber. The gauge further includes an optical signal analyzer connected to the second end of the fiber for receiving and analyzing the first reflected optical signal for ascertaining the change of the pressure based upon the information contained in the reflected optical signal.

According to a second aspect of the present invention, a process for measuring pressure includes the following steps:

- sensing change of the pressure by a mechanical sensor, a characteristic of the sensor varying in correspondence to the change of the pressure;
- varying a characteristic of an optical fiber with one end connected to the sensor in correspondence to the variance of the characteristic of the sensor;
- generating by the fiber a reflected optical signal containing information relating to the variance of the characteristic of the fiber; and
- measuring, at a place substantially distanced from the mechanical sensor, the reflected optical signal for ascertaining the change of pressure.

Other aspects and advantages of the invention will become apparent from the following detailed description, taken in conjunction with the accompanying drawings, which description illustrates by way of example the principles of the invention.

DETAILED DESCRIPTION

Figure 1:
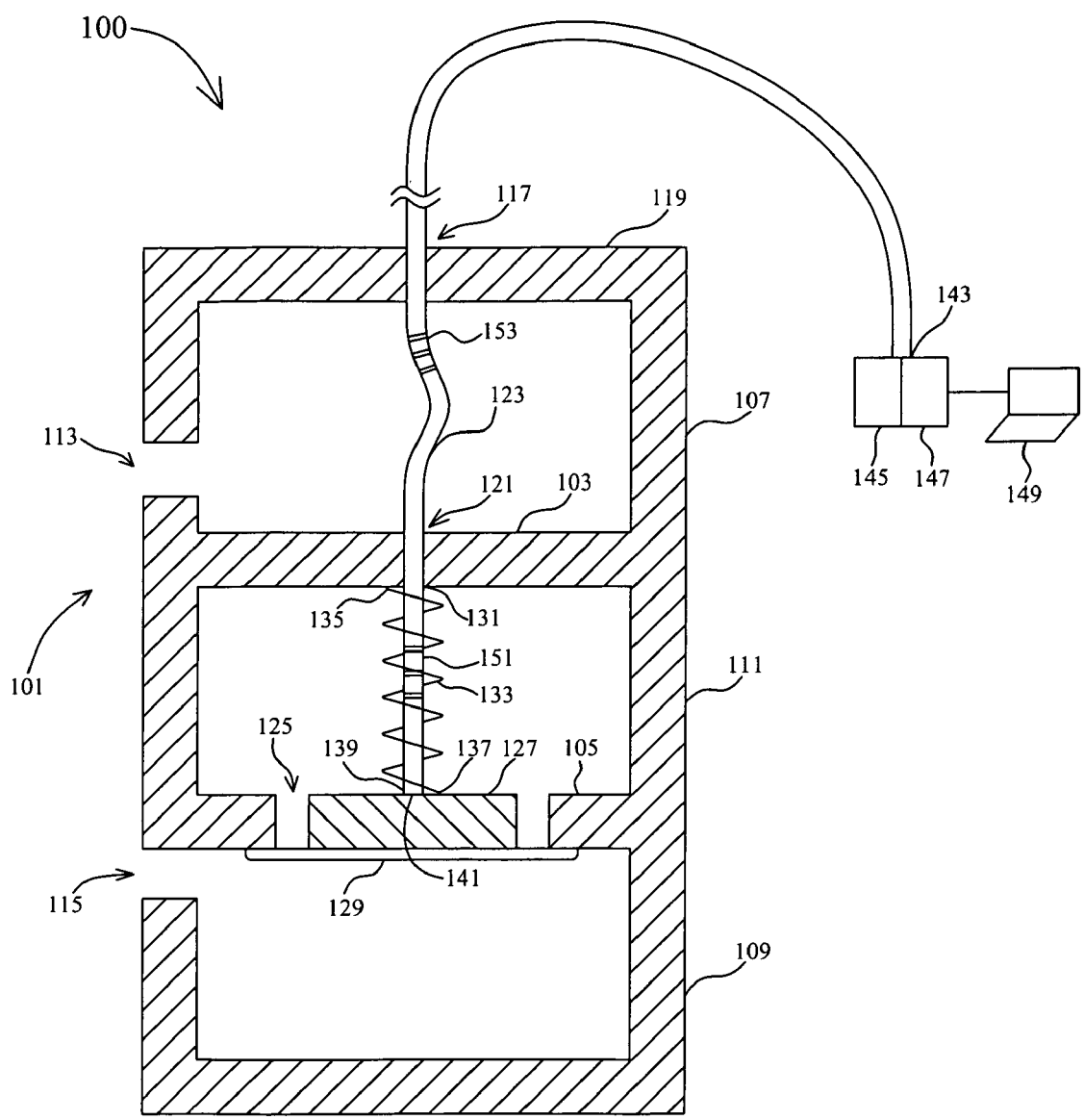
FIG. 1 is an illustrative cross-sectional view illustrating a pressure gauge embodiment of the present invention.

In principal, the present invention is based on the use of a fiber-optical Bragg grating. A Bragg grating is a single modus fiber with permanent periodic variation of the refractive index over a fiber length of, for example 0.1 to 10 cm. The variation in the refractive index is established by illuminating the fiber with a UV laser. A Bragg grating reflects light with a wavelength that depends upon the refractive index and the space related period of the variation of the refractive index (the grating period), while light beyond this wavelength will pass through the grating more or less unhindered. The light reflected by the Bragg grating will exhibit a wavelength that varies as a function of a measurable quantity that changes the refractive index of the fiber material grating and/or the fiber length in the grating zone (grating period). Deformation, tension in the fiber or temperature variations will therefore lead to a change of the wavelength of the light reflected by the Bragg grating.

FIG. 1 illustrates a pressure gauge 100 suitable for measuring pressures according to an exemplary embodiment of the present invention. In the following exemplary discussion, the pressure gauge 100 is used to measure pressure changes in a liquid environment.

The pressure gauge 100 firstly includes a housing 101, which is generally placed inside the liquid environment in operation. The housing 101 is divided by a middle and a lower wall 103, 105 into three chambers, namely, an upper chamber 107, a lower chamber 109 and a middle chamber 111 sandwiched therebetween. All the chambers 107, 109, 111 in the exemplary embodiment have a cylindrical shape.

Both the upper and lower chambers 107, 109 have a bore 113, 115 for the liquid to flow in. The upper chamber 107 further has a cylindrical bore 117 provided on its top wall 119 opposite to the middle wall 103. Opposite to the cylindrical bore 117 on the top wall 119, a cylindrical bore 121 is also provided on the middle wall 103. These cylindrical bores 117, 121 function to allow an optical fiber 123 to thread through the top and middle walls 119, 103 and further into the middle chamber 111.

There is a bore 125 at the middle of the lower wall 105. A mechanical sensor 127, in a shape of a platform in the exemplary embodiment, is located at the center of the bore 125 and is sealed to the lower wall 105 by a diaphragm 129 made of superelastic material such as elastomer or superelastic NiTi alloy. In addition, at the cylindrical bore 121 on the middle wall 103 is arranged a first attachment point 131 for the optical fiber 123 to the housing 101. In the exemplary embodiment, the first attachment point 131 also constitutes a sealing or a barrier against intrusion of pressure or fluids from the surroundings, and may be established, for example, in the form of a glued joint arranged sealingly in the space between the optical fiber 123 and the internal surface (not shown) of the cylindrical bore 121. In this way, the middle chamber 111 is airtight.

A compression spring 133, with one end 135 attached to the middle wall 103 and the other end 137 attached to the mechanical sensor 127, is provided in the middle chamber 111 and pushes the mechanical sensor 127 away from the middle wall 103. The mechanical sensor 127 is kept in equilibrium by the diaphragm 129, the fiber 123 with one end 139 connected to the mechanical sensor 127 and the spring 133 when the pressure gauge 100 is not in operation. Furthermore, it is understood that mechanical sensor 127 can move towards or away from the middle wall 103 in response to change of pressure exerted thereon. In other words, the mechanical sensor 127 is movable in a direction along which a portion of the optical fiber 123 within the middle chamber 111 extends.

As stated, one end 139 of the optical fiber 123 is connected to the mechanical sensor 127 at a second attachment point 141. The other end 143 of the optical fiber 123 is connected to both an optical signal generator 145, which emits optical signals towards the optical fiber 123, and an optical signal receiver 147, which receives reflected optical signals from the optical fiber 123. In the exemplary embodiment, a computer 149 is connected to the optical signal receiver 147 for analyzing the received reflected optical signals. Said other end 143 of the optical fiber 123, the optical signal generator 145, the optical signal receiver 147 and the computer 149 are generally outside the liquid environment in operation.

Furthermore, the optical fiber 123 includes a first Bragg grating 151 created in a first portion of the optical fiber 123 within the middle chamber 111 and a second Bragg grating 153 created in a portion of the optical fiber 123 within the upper chamber 107. The spring 133 is configured such that the first portion of the optical fiber 123 and further the first Bragg grating 151 are freely strapped or strained between the first attachment point 131 at the cylindrical bore 121 on the middle wall 103 and the second attachment point 143 on the mechanical sensor 127. The purpose of pre-straining the first Bragg grating 151 inside the middle chamber 111 is to avoid the first Bragg grating losing tension in operation, especially if the pressure exerted on the mechanical sensor 127 is low. This is also to ensure the first Bragg grating 151 is always under strain or tension throughout the entire operation range, which is essential for the pressure gauge 100 to operate in a repeatable manner. The second Bragg grating 153, on the contrary, is strain-free in the exemplary embodiment due to the fact that the optical fiber 123 freely passes through the cylindrical bore 117 on the top wall 119. The second-Bragg grating 153 is for the purpose of temperature compensation, which will be discussed in detail below.

In operation, the housing 101 is immersed into the liquid environment to a desired position. Liquids flow into both the upper and lower chambers 107, 109 through the holes 113, 115. Fluid pressure is now exerted on the mechanical sensor 127 through the diaphragm 129. In response, the mechanical sensor 127 is pushed towards the middle wall 103 until the spring 133 is compressed to the extent that the spring resistance force balances the fluid pressure exerted on the mechanical sensor 127. Due to the positional change of the mechanical sensor 127 relative to the middle wall 103 or the first attachment point 131, the first Bragg grating 151 undergoes a de-elongation such that the tension or strain in the first Bragg grating 151 decreases. The variance in the tension that the first Bragg grating 151 experiences results in a shift in the reflection wavelength of the optical signal reflected by the first Brag grating 151.

It is noted that the first Bragg grating 151 is sensitive to both the variance of tension in fiber and the temperature variance, that is, the shift in the reflection wavelength of the optical signal reflected by the first Brag grating 151 reflect both the variance in tension the first Bragg grating 151 experiences and the temperature variance. To compensate temperature dependent wavelength displacement in relation to light reflected from the first Bragg grating 151, which primarily is caused by a change in the refractive index of the fiber material as a direct function of the temperature variance, the second Bragg grating 153, which is created in the second portion of the optical fiber 123 within the upper chamber 107 and which is strain-free, is established. In specific, since one end of the second portion of the optical fiber 123 can move freely and since the entire second Bragg grating 153 is surrounded by the fluids, during operation, the second Bragg grating 153 experiences only a very small amount, if any, of variance of tension in fiber as compared to the first Bragg grating 151.

Therefore, by measuring the shifts in the reflection wavelength of the reflected optical signals from the first and second Bragg gratings at the computer 149, which receives the reflected optical signal from the optical fiber 123 through the optical signal receiver 147, the variance of tension that the first Bragg grating 151 experiences can be ascertained. It is understood to an ordinary skilled person in the art that based on the variance of tension that the first Bragg grating 151 experiences, the positional change of the mechanical sensor 127 relative to the first attachment point 131 and consequently the change of pressure exerted on the mechanical sensor 127 by the liquid can be ascertained.

The exemplary pressure gauge embodiment described above merely uses optical and mechanical devices. Thus it will not affected by external electromagnet radiation and is therefore more reliable as compared to conventional pressure gauges using electronic sensors. Furthermore, the exemplary pressure gauge embodiment does not need electricity to be carried through the operation environment to the housing. Such arrangement significantly reduces, if does not eliminate, the chances of generating sparks in operation. Therefore, the exemplary pressure gauge embodiment is suitable for usage at hazardous areas such as flammable liquid.

Using the exemplary pressure gauge embodiment to measure pressure changes in a liquid environment is described above. It is understood it has other applications, for example, in a gas environment or for other more general purposes.

Alternatives can be made to the exemplary embodiment. For example, tension spring can be used; the chambers may have various shapes; the upper and lower chambers may not be necessary; other fiber-optical gratings can be used; other characteristics of the reflected optical signals may also be used. Furthermore, the second Bragg grating may not need to be strain-free so long as during operation, it only experiences only a very small amount, if any, of variance of tension in fiber as compared to the first Bragg grating.

What is claimed is:

1. A pressure gauge, comprising:
   a housing;
   a mechanical sensor placed in the housing for sensing change of the pressure, a characteristic of the sensor varying in correspondence to the change of the pressure;
   an optical fiber, at least part of the fiber being in the housing with a first end connected to the sensor such that a characteristic of the fiber varies in correspondence to the variance of the characteristic of the sensor;
   an optical signal generator connected to a second end of the fiber for emitting an optical signal into the fiber, wherein the second end is distanced from the sensor, wherein the fiber generates at least a first reflected optical signal towards said second end, and wherein the first reflected optical signal contains information relating to the variance of the characteristic of the fiber; and an optical signal analyzer connected to the second end of the fiber for receiving and analyzing the first reflected optical signal for ascertaining the change of the pressure based upon the information contained in the reflected optical signal.

2. The gauge of claim 1, wherein the fiber includes a first Bragg grating in the housing for generating the first reflected optical signal, wherein at least a first characteristic of the Bragg grating varies in correspondence to the variance of said characteristic of the sensor, and wherein the first reflected optical signal contains information relating to the variance of the characteristic of the first Bragg grating.

3. The gauge of claim 2, wherein the housing includes a chamber, wherein the first chamber has a first end, a second end where the mechanical sensor is located, and a first attachment site located at the first end of the chamber, and wherein the first Bragg grating is created in a first portion of the fiber held between the first attachment site and the mechanical sensor.

4. The gauge of claim 3, wherein the mechanical sensor is designed to be a platform movable in response to the change of the pressure in a direction in which the first portion of the fiber extends.

5. The gauge of claim 3, wherein the first Bragg grating is pre-strained between the first attachment site and the mechanical sensor.

6. The gauge of claim 3, further comprising a spring with one end attached to the mechanical sensor for keeping the mechanical sensor in equilibrium.

7. The gauge of claim 3, wherein the first Bragg grating is sensitive to both the change of the pressure and temperature changes in an operation environment, the gauge further comprising
a second Bragg grating for generating a second reflected optical signal towards the second end of the fiber for temperature compensation.

8. The gauge of claim 7, wherein the second Bragg grating is created in a second portion of the fiber out of the chamber with one end attached to the first attachment site and is in close proximity to the chamber, and wherein the second Bragg grating is substantially more sensitive to the temperature change in the operation environment as compared to the pressure change in the operating environment.

9. The gauge of claim 1, wherein the second end is out of the housing and is substantially distanced from the sensor.

10. A process for measuring pressure, comprising:
sensing change of the pressure by a mechanical sensor, a characteristic of the sensor varying in correspondence to change of the pressure;
varying a characteristic of an optical fiber with one end connected to the sensor in correspondence to the variance of the characteristic of the sensor;
generating by the fiber a reflected optical signal containing information relating to the variance of the characteristic of the fiber; and
measuring, at a place substantially distanced from the mechanical sensor, the reflected optical signal for ascertaining the change of pressure.

11. The process of claim 10, further comprising
creating a first Bragg grating in the fiber for generating a first reflected optical signal reflecting both the change of the pressure and temperature change in an operation environment.

12. The process of claim 11, further comprising
creating a second Bragg grating in the fiber for generating a second reflected optical signal reflecting the temperature change in the operation environment.

13. The process of claim 10, wherein a portion of the fiber is held between the sensor and a first attachment site, wherein the step of sensing the change of the pressure by the mechanical sensor includes varying a position of the sensor relative to the first attachment site, and wherein the step of varying the characteristic of the fiber includes varying a tension in said portion of the fiber.

14. The process of claim 10, wherein the measuring step includes measuring a wavelength shift of the reflected optical signal.

* * * * *